(12) United States Patent
Hollar et al.

(10) Patent No.: US 7,045,730 B2
(45) Date of Patent: *May 16, 2006

(54) TAMPER RESISTANCE APPARATUS FOR AN ELECTRICAL DEVICE AND AN ELECTRICAL DEVICE INCLUDING THE APPARATUS

(75) Inventors: Michael Hollar, Los Gatos, CA (US); Mikhail Soyfertis, Sunnyvale, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 162 days.

This patent is subject to a terminal disclaimer.

(21) Appl. No.: 10/750,555

(22) Filed: Dec. 30, 2003

(65) Prior Publication Data

US 2005/0141177 A1 Jun. 30, 2005

(51) Int. Cl.
*H01H 1/64* (2006.01)
*H01H 13/04* (2006.01)

(52) U.S. Cl. .................. 200/293; 200/300; 439/535; 174/50

(58) Field of Classification Search ........... 200/293, 200/300; 439/535; 174/50, 53, 57, 58; 220/402
See application file for complete search history.

(56) References Cited

U.S. PATENT DOCUMENTS

| 4,162,516 | A  | * | 7/1979  | Becker ..................... 361/668 |
| 5,339,072 | A  | * | 8/1994  | Agata ....................... 340/693.6 |
| 5,359,168 | A  | * | 10/1994 | Cunningham ............ 200/61.08 |
| 6,239,394 | B1 | * | 5/2001  | Wu ........................... 200/302.1 |
| 6,255,610 | B1 | * | 7/2001  | Botz et al. ................. 200/315 |
| 6,367,642 | B1 | * | 4/2002  | Kambouris et al. ........ 220/4.22 |
| 6,492,590 | B1 | * | 12/2002 | Cheng ......................... 174/50 |
| 6,527,135 | B1 | * | 3/2003  | Braun et al. ............... 220/4.02 |
| 6,708,834 | B1 | * | 3/2004  | Hagerman, III ............ 220/4.02 |
| 6,717,050 | B1 | * | 4/2004  | Laflamme et al. ............ 174/50 |
| 6,838,619 | B1 | * | 1/2005  | Soyfertis ..................... 174/50 |

* cited by examiner

*Primary Examiner*—K. Lee
(74) *Attorney, Agent, or Firm*—Ingrassia Fisher Lorenz

(57) ABSTRACT

An apparatus for preventing tampering into an electrical device container in which a power circuit is at least partially enclosed includes a housing having a first end that is adapted to be positioned adjacent to the power circuit, and a second end that is adapted to be coupled to the container. The apparatus also comprises an electrical switch adapted to be coupled to the power circuit and having a main body portion that is secured within the housing and extends substantially from the first end to the second end.

24 Claims, 4 Drawing Sheets

TAMPER RESISTANCE APPARATUS FOR AN ELECTRICAL DEVICE AND AN ELECTRICAL DEVICE INCLUDING THE APPARATUS

TECHNICAL FIELD

The present invention generally relates to data terminals such as personal identification number (PIN) pad transaction devices, telecommunication equipment, scanners, and other devices that receive, store, or transmit data. More particularly, the present invention relates to devices and methods for making such electrical modules tamper resistant.

BACKGROUND

Many electrical devices store or transmit data that may be encrypted or otherwise secured. Such devices often include mechanical or electrical tamper resistance equipment to prevent a security breach. Tamper resistance equipment sometimes includes a mechanism to block or disconnect a communication line or a power line when security is breached. For instance, if the electrical device is opened in an unauthorized manner the device may be programmed or equipped to shut down entirely or in part.

One type of tamper resistance apparatus includes a switch that is connected to a power source. The switch is included in a housing that is mounted on a circuit board that includes the power circuit. The housing maintains electrical contact between the switch and the power source as long as the apparatus is structurally intact. If the device is opened or has its structural integrity compromised in some other way, the housing is displaced. The switch is displaced along with the housing, causing a break in the power circuit. The loss of power is one way that data retrieval from the apparatus is prevented.

Although the above-described tamper resistance apparatus is very effective in most cases, some people have attempted to find ways to open electrical devices without breaking the power circuit. One possible way to maintain the power circuit may be to drill into the device interior and break any joints that would normally pull the tamper resistance apparatus away from the power circuit when the device is opened. Another possible way to maintain the power circuit may be to insert glue into the device interior to adhere the circuit housing to a circuit board so that the switch is not pulled away when the device is opened. Yet another possible way to prevent the power circuit from breaking may be to insert a conductive fluid into the housing interior. The conductive fluid will complete the power circuit even if the switch is pulled away from the circuit board.

Although the above attempts for opening the electrical device without breaking the power circuit would not be very effective, it is desirable to provide an improved tamper resistance apparatus. In addition, it is desirable to provide an efficient and cost effective way to manufacture the improved tamper resistance apparatus. Furthermore, other desirable features and characteristics of the present invention will become apparent from the subsequent detailed description and the appended claims, taken in conjunction with the accompanying drawings and the foregoing technical field and background.

BRIEF SUMMARY

An apparatus is provided to prevent tampering into an electrical device container in which a power circuit is at least partially enclosed. The apparatus comprises a housing having a first end that is adapted to be positioned adjacent to the power circuit, and a second end that is adapted to be coupled to the container. The apparatus also comprises an electrical switch adapted to be coupled to the power circuit and having a main body portion that is secured within the housing and extends substantially from the first end to the second end.

A tamper resistant electrical device is also provided. The device comprises a container, a substrate disposed inside the container, a power circuit formed on the substrate, and an apparatus to prevent tampering into the container. The apparatus to prevent tampering comprises a housing having a first end positioned adjacent to the power circuit, and a second end that is coupled to the container. The apparatus also comprises an electrical switch coupled to the power circuit and having a main body portion that is secured within the housing and extends substantially from the housing first end to the housing second end.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
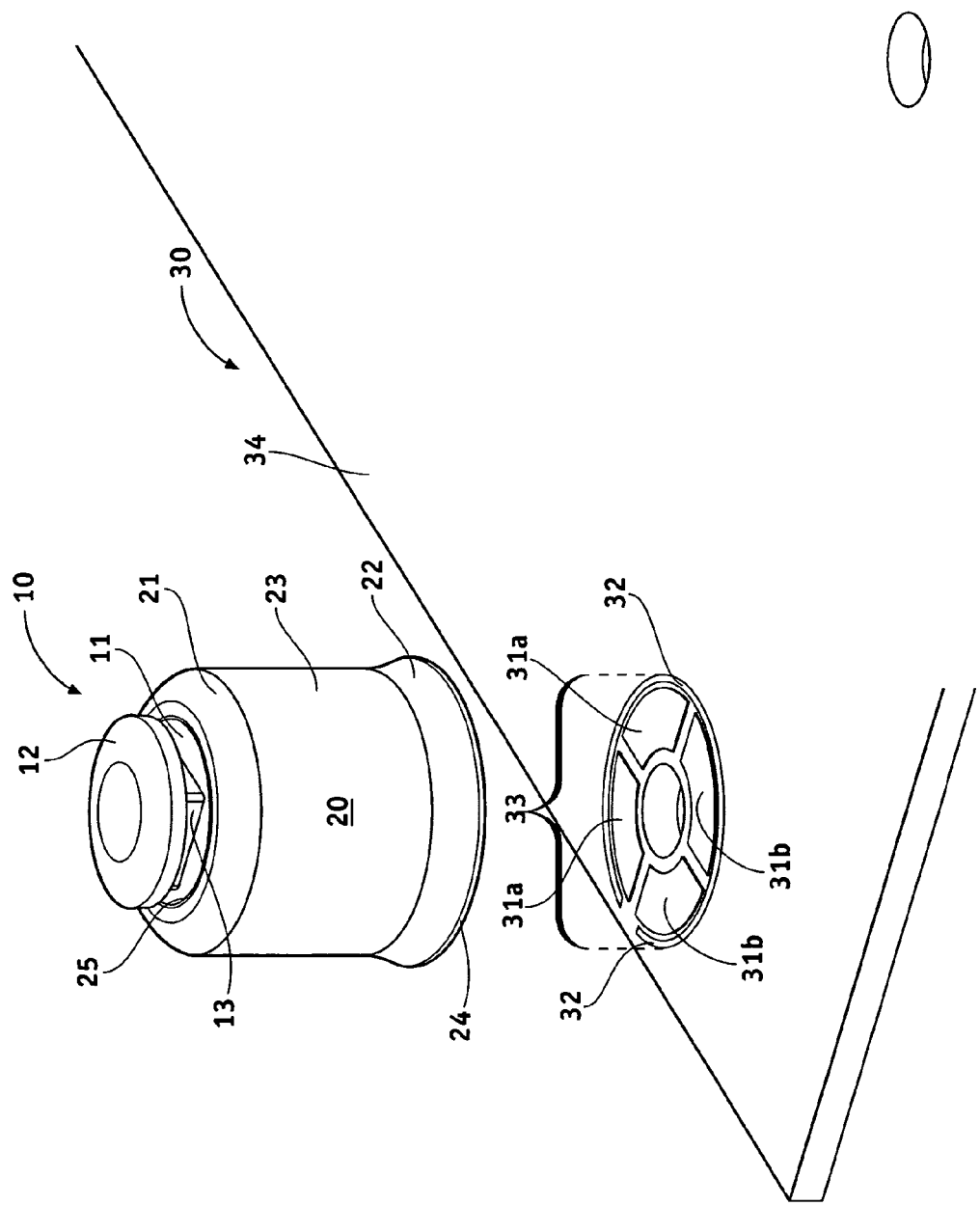
FIG. 1 is an exploded view of a circuit board and a tamper resistance apparatus mounted thereon during use according to an embodiment of the present invention.

The present invention includes a tamper resistance apparatus, including an electrical switch that is held in place within an electrical device interior and completes a power circuit until the device's structural integrity is compromised. The tamper resistance apparatus can be utilized with any suitable electrical device, and exemplary devices include data terminals such as personal identification number (PIN) pad transaction devices, telecommunication equipment, scanners, and other devices that receive, store, or transmit private or sensitive data. FIG. 1 is an exploded view of a circuit board 30 having a surface 34 with a tamper resistance apparatus 10 mounted thereon during use according to one embodiment of the invention. The circuit board 30 is coupled to the device housing (not shown), and includes power circuit contacts 31 that are coupled to at least one power source. In the embodiment depicted in FIG. 1, two of the power circuit contacts 31a are connected to an external power source and two other power circuit contacts 31b are connected to an internal power source such as a battery. A ground material 32 surrounds the power circuit contacts 31, and defines a mounting area 33 on the circuit board surface 34.

Figure 2:
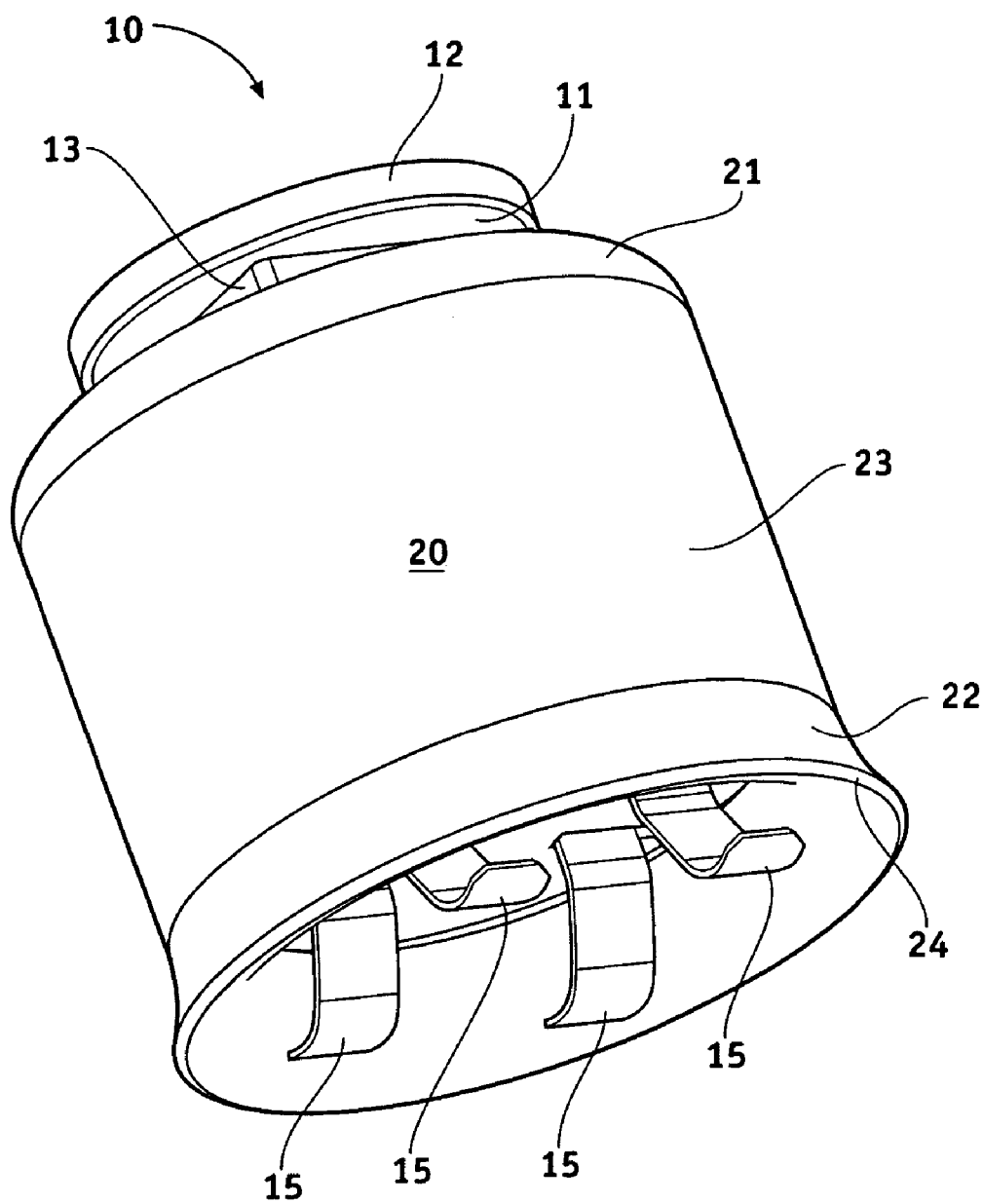
FIG. 2 is an isometric view of a tamper resistance apparatus according to an embodiment of the present invention.
Figure 3:
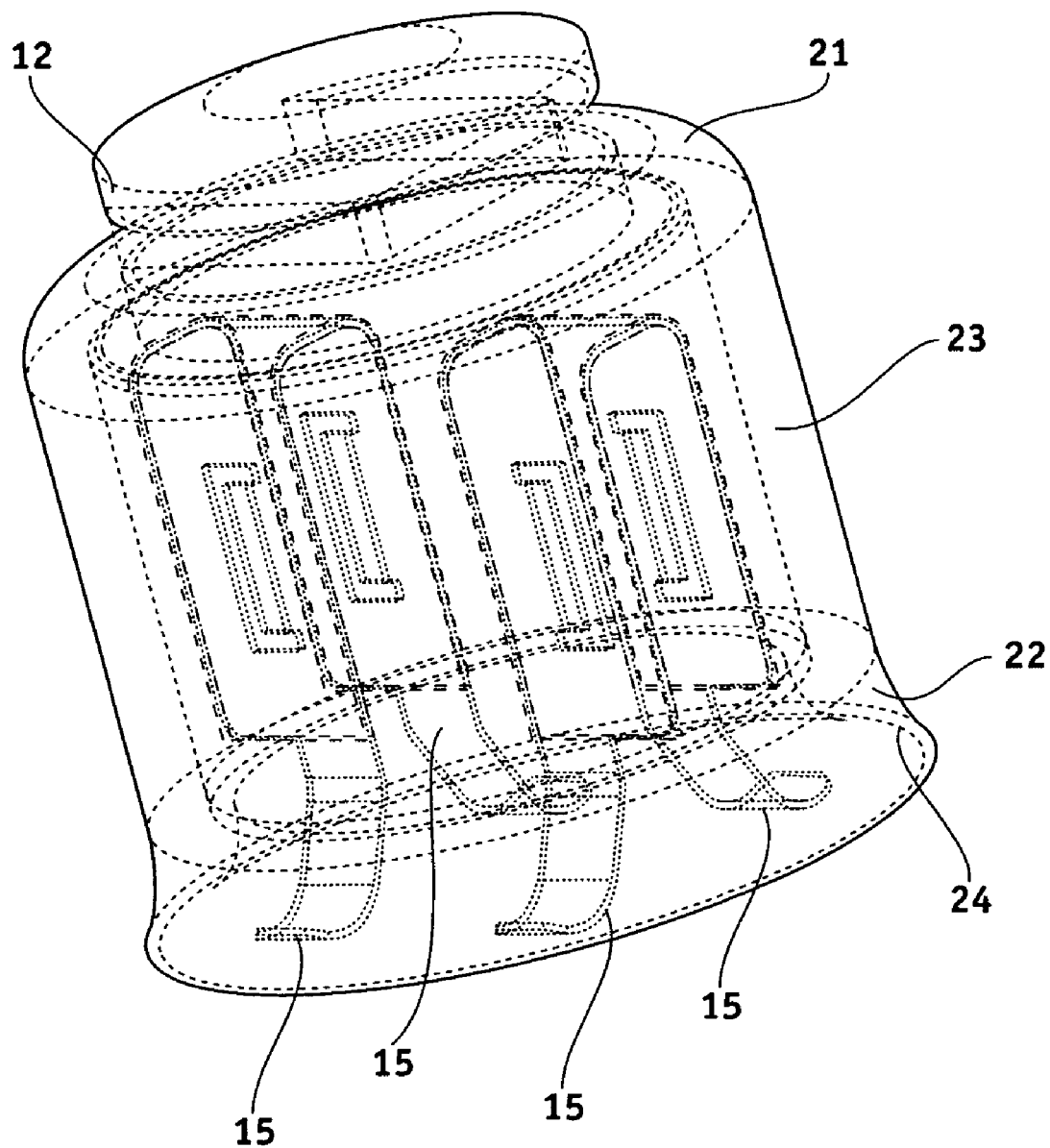
FIG. 3 is a transparent isometric view of a tamper resistance apparatus according to an embodiment of the invention.
Figure 4:
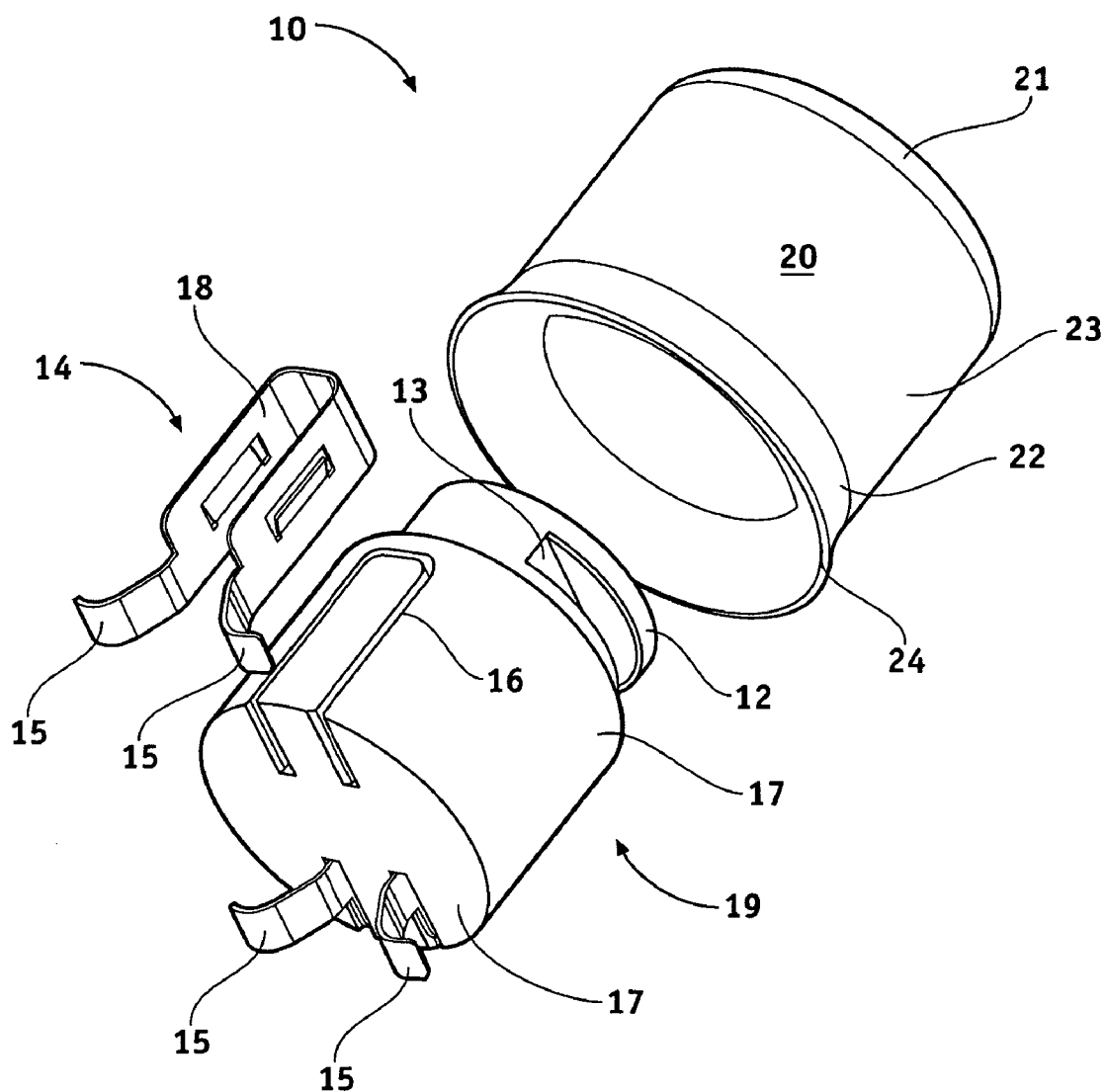
FIG. 4 is an exploded view of a tamper resistance apparatus according to an embodiment of the invention.

FIGS. 2 to 4 illustrate the tamper resistance apparatus 10, which includes a generally nonconductive boss 19 that houses electrical contacts 14 and is partially surrounded by a nonconductive skirt 20. FIGS. 2 and 3 are isometric views of the apparatus 10, with FIG. 3 providing a transparent view to depict the interior components as well as the apparatus exterior. An exploded view of the apparatus 10 is depicted in FIG. 4. The boss 19 is typically formed of a nonconductive material such as a hard molded resin to prevent a short in the power circuit. A groove 11 can be molded or otherwise formed in the resin or other generally nonconductive material to engage with a chassis or other device component (not shown) when the tamper resistance apparatus 10 is installed. A structure such as the square-edged body 13 inside the groove 11 further enables a secure coupling with a portion of the chassis or other device component that is adapted to match with the square-edged body 13. If the electrical device's structural integrity is subject to tampering or otherwise compromised, a lip 12 on one side of the groove 11 will be pulled by the device chassis or other engaging component, and the entire tamper resistance apparatus 10 will be separated from the circuit board mounting area 32.

At least one electrical switch 14 is secured partially inside the boss 19. Each switch 14 includes a main body portion 18 that is housed inside the boss 19 when the apparatus 10 is intact, and two contacts 15 that extend outside the boss 19. In an exemplary embodiment, each contact 15 bends inwardly or outwardly from the point where contact 15 exits the boss 19, and they preferably flange at an angle that allows each contact 15 to lie flatly against the circuit board mounting area 32. Each contact 15 is preferably made of a bendable conductive metal strip that is sufficiently rigid to retain its shape after bending. When the boss 19 is installed, each contact 15 bends slightly as it is pressed against the circuit board 30, and the spring force for the contact 15 to retain its original shape also secures contact between the contact 15 and the circuit contact 31. The apparatus 10 is assembled by sliding each switch 14 through respective slots 16 formed in the boss walls 17 so that the switch contacts 15 can extend outside the boss 19 to the circuit board mounting area 32 and complete the power circuit by coupling with the power circuit contacts 31.

Each switch 14 is rigidly mounted in a slot 16 and is consequently separated from the power circuit contacts 31 if the boss 19 is repositioned. Although mounting flanges are shown in FIGS. 3 and 4 protruding from the switch main body portion 18 to rigidly mount each switch 14, nonconductive adhesive compounds or additional ribs, flanges, and other mechanical structures can be used to secure each switch 14 with respect to the boss 19. Further, boss 19 may be molded or otherwise formed around each switch 14 when the boss 19 is manufactured, thereby removing the need for slots 16 in the boss walls 17.

Each slot 16 and switch main body portion 18 is approximately U-shaped in an exemplary embodiment of the invention. When installed, the main body portion 18 of each switch 14 enters the boss 19 through a wall 17 that is to be near a power circuit contact 31. The main body portion 18 then extends entirely across the boss 19 and bends just before it reaches the groove 11 that engages with a chassis or other device component (not shown) when the tamper resistance apparatus 10 is installed. After bending away from the groove 11, the main body portion 18 extends back toward another power circuit contact 31 and exits the boss 19 through a wall 17. Thus, the main body portion 18 of each switch 14 spans almost entirely across a width of the boss 19.

One way that the boss may be repositioned is by separating the circuit board 30 from the chassis (not shown) that engages with the boss groove 11. The circuit board 30 and the chassis are typically separated if the electrical device is being tampered with, and the tamper resistance apparatus 10 causes power to be disconnected if such tampering occurs. As mentioned above, one way to separate the circuit board 30 from the chassis (not shown) that engages with the boss and still maintain the power circuit is to cut or drill through the boss 19 in a manner that leaves each switch 14 intact. The present invention circumvents this approach by spanning each switch from one end of the boss 19 to the other end. With each switch 14 formed in a U-shape or other shape that extends across the boss 19, any drilling or cutting will likely sever the switch 14 and disconnect the power circuit that the switch completed. The U-shaped switch 14 approaches the groove 11 so closely that it is difficult to cut any part of the boss 19 without disconnecting the power circuit and thereby disabling the entire electrical device in which the tamper resistance apparatus is disposed.

In another embodiment of the invention, the boss 19 itself is manufactured at least in part from a conductive material that completes the power circuit. Severing the boss 19 will disconnect the power circuit and thereby disable the entire electrical device. Insulation material is placed between the boss 19 and other conductive structures in order to prevent a short in the power circuit. In an exemplary embodiment, the conductive material also approaches the groove 11 so closely that it is difficult to cut any part of the boss 19 without disconnecting the power circuit and thereby disabling the entire electrical device.

In yet another embodiment of the invention that may be used in conjunction with either of the embodiments set forth above, the electrical device can include a security processor that is coupled to the power circuit. When the power circuit is disconnected, an interrupt signal is transmitted to the processor that instructs the processor to erase any sensitive information from selected memory locations. The security processor may be powered by a separate power source in order to perform this active security feature.

Another way to maintain the power circuit during tampering is to insert glue into the device interior to adhere the boss 19 to the circuit board 30 so that the switch contacts 14 are not displaced when the device is opened. Another possible way to prevent the power circuit from breaking is to insert a conductive fluid into the device. The conductive fluid completes the power circuit even if the switch contacts 14 are pulled away from the circuit board 30. In order to prevent glue or conductive fluid from disabling the tamper resistance apparatus 10, the skirt 20 is provided about the boss periphery. The skirt 20 is shaped to conform to the boss dimensions. More particularly, the skirt depicted in the figures includes a wall 23 that snugly surrounds at least a portion of the boss wall 17.

In an exemplary embodiment of the invention, an outwardly flaring portion 22 of the wall 17 extends outwardly at one end of the skirt 20. The outwardly flaring portion 22 also defines a circular edge 24 that abuts the circuit board 30 to shield the circuit board mounting area 33 from glue or conductive fluid. The flaring portion 22 has an increasing diameter as it approaches the mounting area, and consequently directs any glue or other fluid away from the mounting area 32. In a further exemplary embodiment, the circular edge 24 is sized to surround the ground material 32 that defines the mounting area 32, and to thereby create a fluid-impermeable seal around the power circuit contacts 31 in the mounting area 32.

In yet another exemplary embodiment of the invention, the skirt 20 includes a soft shoulder portion 21 that defines an opening 25 through which the boss lip 12 and grove 11 extend. The soft shoulder portion 21 allows the groove 11 to remain exposed for engagement with the device chassis (not shown), but creates a substantially fluid-impermeable seal with the boss 19 to prevent glue or conductive fluid from reaching the skirt interior. The opening 25 can have a substantially circular shape, with a diameter that is smaller than the soft shoulder portion 21 to allow the soft shoulder portion 21 to form around the boss 19 and create the substantially fluid impermeable seal.

The skirt 20 is made of a suitable nonconductive material, and typically is made of a soft rubber such as polyurethane or another soft material. In an exemplary embodiment the entire skirt 20 is uniformly made of a single rubber material, including the flaring portion 22 and the soft shoulder portion 21. Alternatively, the skirt 20 may be formed primarily from a relatively rigid material as long as the soft shoulder portion 21 is made of the made of a sufficiently soft and pliable material to allow the entire boss 19 to be pulled through the opening 21 in the event that the boss 19 is pulled away from the circuit board 30. Therefore, if the electrical device has its structural integrity compromised such that the circuit board and a chassis (not shown) engaging with the groove 11 are separated, the boss 19 can separate from the circuit board 30 without hindrance from the skirt 20. If glue or conductive fluid has been inserted into the device interior as an attempt to hold the boss 19 in place, the skirt will prevent the glue or conductive fluid from contacting the boss 19. If the skirt 20 becomes glued in place before the electrical device is opened, the boss 19 will be pulled through the opening 25 or sufficiently displaced to disconnect the power circuit. Consequently, the skirt 20 in combination with the boss provides a tamper resistance apparatus 10 that prevents sensitive data from being removed from the electrical device due to tampering.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An apparatus to prevent tampering into an electrical device container in which a power circuit is at least partially enclosed, the apparatus comprising:
   a housing having first and second ends, the second end having an attachment mechanism for coupling the housing to said container; and
   an electrical switch having contact terminals for coupling the switch to said power circuit and further having a main body portion that is secured within said housing and extends substantially from said first end to said second end.

2. The apparatus according to claim 1, wherein said electrical switch terminals are coupled to said main body portion and extend outside of said housing for coupling with said power circuit.

3. The apparatus according to claim 2, wherein said terminals bend outside of said housing first end to engage with said power circuit with a spring force.

4. The apparatus according to claim 1, wherein said main body consists of a substantially U-shaped structure that enters and exits said housing at said first end and turns approximately 180° adjacent to said second end.

5. The apparatus according to claim 4, wherein said housing includes a substantially U-shaped slot slidingly receiving said electrical switch and securing said electrical switch therein.

6. The apparatus according to claim 1, wherein said housing includes a slot to slidingly receive said electrical switch and secure said electrical switch therein.

7. The apparatus according to claim 6, wherein said main body portion includes at least one flange that protrudes against said slot to secure said electrical switch therein.

8. The apparatus according to claim 7, wherein said attachment mechanism comprises a groove for direct engagement with said container.

9. The apparatus to claim 8, wherein said attachment mechanism further comprises a lip that is continuous with said groove for direct engagement with said container.

10. The apparatus according to claim 8, wherein said attachment mechanism further comprises a square edged body that is disposed within said groove for direct engagement with said container.

11. A tamper resistant electrical device, comprising:
    a container;
    a substrate disposed inside said container;
    a power circuit formed on said substrate; and
    an apparatus to prevent tampering into said container, comprising:
      a housing having a first end positioned adjacent to said power circuit, and a second end having an attachment mechanism for coupling the housing to said container, and
      an electrical switch coupled to said power circuit and having a main body portion that is secured within said housing and extends substantially from said first end to said second end.

12. The device according to claim 11, wherein said electrical switch includes terminals extending outside of said housing and coupling said main body portion to said power circuit.

13. The device according to claim 12, wherein said terminals bend outside of said housing first end and engage with said power circuit with a spring force.

14. The device according to claim 11, wherein said main body consists of a substantially U-shaped structure that enters and exits said housing at said first end and turns approximately 180° adjacent to said second end.

15. The device according to claim 14, wherein said housing includes a substantially U-shaped slot slidingly receiving said electrical switch and securing said electrical switch therein.

16. The device according to claim 11, wherein said housing includes a slot slidingly receiving said electrical switch and securing said electrical switch therein.

17. The device according to claim 16, wherein said main body portion includes at least one flange that protrudes against said slot to secure said electrical switch therein.

18. The device according to claim 17, wherein said attachment mechanism comprises a groove directly engaged with said container.

19. The device to claim 18, wherein said attachment mechanism further comprises a lip that is continuous with said groove and is also directly engaged with said container.

20. The device according to claim 18, wherein said attachment mechanism further comprises a square edged body that is disposed within said groove and is also directly engaged with said container.

21. The device according to claim 11, wherein said substrate comprises power circuit contacts that are coupled to said electrical switch.

22. The device according to claim 21, wherein said substrate further comprises a ground material formed on said substrate and defining a mounting area that includes said power circuit contacts.

23. An apparatus to prevent tampering into an electrical device container in which a power circuit is at least partially enclosed, the apparatus comprising:
a housing having a first end that comprises a conductive material for electrically coupling the housing to said power circuit, and a second end having an attachment mechanism for coupling the housing to said container.

24. An apparatus according to claim 23, wherein said conductive material extends from said first end proximate to said second end.

* * * * *